THIN FILM CLOSED FLUX STORAGE ELEMENT

Filed May 25, 1967

INVENTOR.
IRVING W. WOLF

BY Robert S. Clay

ATTORNEY 3,553,660

THIN FILM CLOSED FLUX STORAGE ELEMENT

Irving W. Wolf, Palo Alto, Calif., assignor to Ampex Corporation, Redwood City, Calif., a corporation of California Filed May 25, 1967, Ser. No. 641,293
Int. Cl. G11c *11/14*
U.S. Cl. 340—174 4 Claims

ABSTRACT OF THE DISCLOSURE

A closed flux storage element having two magnetic thin films which are fully connected together along the entire thickness of their lateral edges with magnetic material and having an electrical conductor sandwiched between the films, thus providing an element cross section which defines a completely closed flux structure, wherein the absolute closure of the flux path as well as the quality of the magnetic thin film disposed on the electrical conductor, is preserved by utilizing a thin film of smoothing material between the film and conductor.

BACKGROUND OF THE INVENTION

The invention relates generally to magnetic thin film memory elements and systems, and particularly describes a closed flux thin film memory structure which can be utilized to form destructive and, particularly, non-destructive readout memory systems.

Matrices of thin magnetic film are well known for high speed storage purposes. There are generally two basic types of film memories in common use at present; those using planar films and those using cylindrical films for storage. Planar magnetic films of high quality tape can be made relatively thin whereby self-demagnetization effects are reduced. However, any magnetic domain in a planar film is by its nature an open flux configuration. Therefore, demagnetization effects near the edges of a planar domain prove to be a threat to the stability of a memory cell. This situation can be somewhat improved by juxtaposing two thin films, and thus the memory cells, to form thus a "sandwich" and by magnetizing the cells in anti-parallel relations. This sandwich type of configuration, showing a quasi-closed flux structure is described in the article, "Closed-Flux Thin Magnetic Film Memory Prepared by Electroplating," by J. E. Eide, published in the Journal of Applied Physics, vol. 37, No. 3, Mar. 1, 1966, pp. 1365–66. However, such a sandwich, or bicore, element generally does not provide a full closure of the magnetic flux path; that is, the vertically extending magnetic films do not, in fact, fully contact the top film of magnetic material and thus fail to provide a constant thickness of magnetic flux path.

In cylindrical films where a magnetic film is deposited onto a wire with its easy axis along the circumference, there is no problem of flux closure. However, the surface roughness of wire rods leads to a comparatively high anisotropy dispersion and thus poor film quality. In addition, the surface quality of the state-of-the-art cylindrical substrates has limited the deposition of magnetic films to thicknesses higher than 5,000 A. Although such a thickness yields a larger sense signal, severe demagnetization and creep problems result, which impair the stability of stored information. Furthermore, cylindrical films present a severe handling problem because their substrate, a relatively thin wire, is much less rigid or durable than the substrates used for planar films.

Although both of the storage element configurations cited above are utilized in fabricating memory systems, they exhibit inherent disadvantages of poor packing density and poor reliability. Because poor packing density means reduced memory cycle speed and greater power consumption, small bit size becomes an even more important and desirable property. Accordingly, it is desirable therefore that a high quality memory cell, which lends itself to extremely high packing densities, be made available.

SUMMARY OF THE INVENTION

The present invention provides an improved storage element with a closed flux structure which effectively combines the advantages of a planar film storage element with those of a cylindrical film storage element. The closed flux storage element of the invention comprises two spaced-apart thin films of magnetic material between which is sandwiched an electrically conductive layer of a selected metal. The "top" layer of magnetic film deposited on the conducting material would generally exhibit rather poor magnetic qualities due to the microscopic roughness of the conductive layer which results in increased easy axis dispersion, and due to the fact that a good deal of interaction, presumably of an epitaxial nature, takes place between the crystals in the metallic layer and the atoms of the deposited magnetic film. To overcome these poor conditions, the present invention utilizes a special layer of non-magnetic, fine grained material such as, for example, nickel-phosphorus, which provides a "smoothing" film and effect on the surface of the conductive layer. The "top" or second layer of magnetic material deposited on the conductive layer, and more particularly upon the nickel-phosphorus layer, is thus isolated from the epitaxial or other effects imposed by the conductive layer, such that the magnetic characteristics of the second layer are vastly improved. The closed flux structure of the invention is completed by "vertical" closure films of magnetic material preferably of high permeability which films span across and are completely connected to the full thickness of the respective lateral edges of the spaced-apart thin magnetic films.

Accordingly, the present invention provides all the inherent advantages of a closed flux structure when compared to planar and cylindrical storage elements, while providing the additional advantages of a closed flux configuration having a path which is completely closed, unlike various prior art bicore or sandwich elements which actually provide only a quasi-closed flux structure.

DESCRIPTION OF THE PREFERRED EMBODIMENTS

Figure 1:
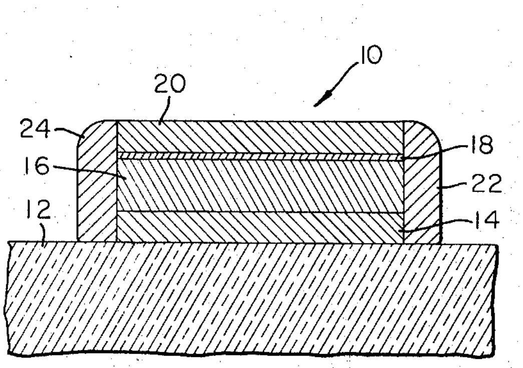
FIG. 1 is a cross section view of a closed flux storage element of the present invention.

Referring to FIG. 1, there is shown a closed flux storage element 10 of the invention, disposed on a substrate 12 formed of a "smooth," rigid material such as glass, or of a "smooth," flexible material having a resin-coated surface, such as a polyester material. A first thin magnetic film 14 is disposed on the substrate 12 and an electrically conductive layer 16 is disposed on the first film 14. As known in the art, it is generally necessary to form a conductive layer (not shown) on the substrate 12 in order to allow depositing the first film 14. A very thin film 18 of a non-magnetic, fine grained material such as, for example, nickel-phosphorus, is disposed on the electrical conducting layer 16 and a second thin magnetic film 20 is disposed on the film 18. Vertical flux closure films 22, 24 are formed along the lateral edges of the combination of films 14, 18, 20 and layer 16 thereby providing a fully continuous, magnetic flux path between the edges of the magnetic films 14 and 20 to provide a structure which also encloses the electrically conductive layer 16.

The conductive layer 16 may be formed of any of the usual electrically conductive materials such as, for example, copper or silver. The thickness of the layer 16 is dependent on the conductance required for the particular memory; e.g., is dependent on the length of the element 10. The thin magnetic films 14 and 20 may be formed of any of the usual magnetic film materials such as, for example, Permalloy, and may be formed of either high or low (e.g., "hard" or "soft") coercive force materials, dependent upon whether the element is used in a destructive or non-destructive readout system. Thus, as well known in the art, a soft film may be made of a nickel-iron composition and a hard film may be made of a nickel-iron-cobalt composition. The thicknesses of films 14 and 20 may vary by way of example only from 100 A. to 1 micron. The vertical flux closure films 22, 24 are made of a magnetic material, preferably of high permeability such as Permalloy, wherein the material as well as the thickness thereof is determined by the magnetization saturation; that is, the closure films 22, 24 properties should provide matching of the magnetization saturation throughout the closed flux structure. Thus by varying the thickness of the closure films 22, 24 and by selecting a material of corresponding permeability, the magnetization saturation between films is matched around the closed path. By way of example, the thickness of films 22, 24 may vary from 100 A. to 2 microns. The films 22, 24 may be formed of a material of high permeability, wherein minor ingredients are added, for example, to optimize the plating procedure, such materials being, by way of example, zinc, cadmium, cobalt, copper, etc.

The non-magnetic, fine grained film 18 is preferably formed of a nickel-phosphorus composition having a content of 80–92 percent nickel and 8–20 percent phosphorus, but may also be formed of other suitable materials such as, for example, chromium, non-magnetic nickel-chromium, rhodium and various ones of its alloys which have the desired properties. The thickness of the film 18 is generally greater than 50 A.

As mentioned above, the element 10 may be fabricated with both magnetic films 14 and 20 being formed of a soft magnetic material to provide thus a destructive readout system. However, the film 14, for example, could be formed of a hard magnetic material, whereby a non-destructive readout system may be fabricated, as further described hereinafter. The materials of the various films and layers are formed by the usual, known electrodepositing and etching techniques used in the art of magnetic film fabrication.

Figure 2:
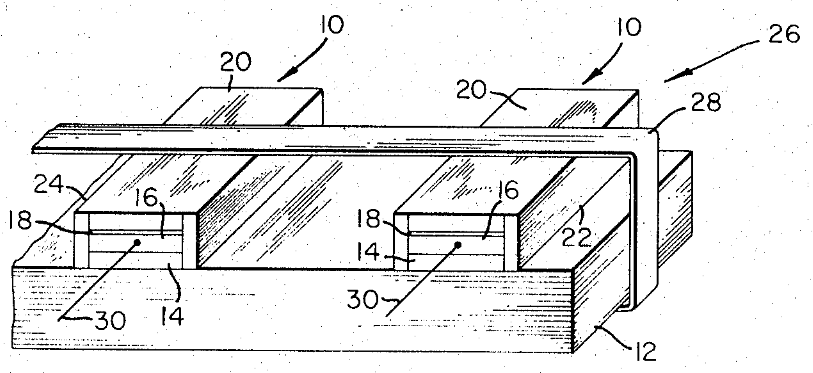
FIG. 2 is a perspective view of a memory array utilizing the closed flux storage element of FIG. 1, and including apparatus for writing and reading out information.

Referring now to FIG. 2, there is shown, by way of example only, a portion of a memory array 26 utilizing a pair of the closed flux storage elements 10 of the invention. The elements 10 are disposed on a suitable substrate 12. In order to subdivide the storage elements 10, i.e., to provide storage regions or bits along the lengths thereof, a set strip line conductor 28 is disposed orthogonally about the elements 10 and the substrate 12 in a manner generally known in the art. The conductor 28 may be fabricated in the conventional manner utilizing etching and depositing of a material, or it may be fabricated by depositing it on a separate substrate such as a flexible tape, which is then disposed immediately adjacent the storage elements 10.

The operation of the array 26 of FIG. 2 is described herein with respect to a non-destructive readout system utilizing storage elements 10 formed of hard film 14 and a soft film 20. Storage of information is accomplished by supplying enough field to the elements 10 to switch the hard film 14 thereof. Field normally is applied by the coincidence of a direct drive field generated when current is supplied to the conductive layers 16 via the leads 30, and a transverse drive field generated by applying a current to the conductor 28. In reading out the elements 10, a field insufficient to permanently disturb the information recorded in the hard film 14, is supplied from the transverse drive, e.g., the conductor 28. This field will rotate the magnetization in the soft magnetic film 20 resulting in an induced current, and voltage, in the conductive layer 16. This induced current is representative of the information recorded and may be sensed by conventional means to effect readout of the memory array 26.

In destructive readout systems, the memory array utilizes storage elements 10 formed of soft magnetic films 14 and 20, wherein bits are recorded by the application of a field to the elements 10 via the conductor 28 and conductive layer 16 and readout is accomplished by applying a read current to the conductor 28 only, and simultaneously sensing the direction of the current generated in layer 16 due to the change in flux from the magnetic films 14 and 20.

As shown in FIG. 1, perfect flux closure is obtained by the use of the non-magnetic film 18, whereby no interaction between the magnetic material of adjacent elements 10 (FIG. 2) can take place. The field produced by the conductive layer 16 represents the only disturbing influence for any adjacent elements 10. This is because the field produced by one element 10 consists of a vertical component only as seen by adjacent elements, and thus is insignificant. Thus packing density is limited by fabrication technology and not by interaction problems, as is the case for both conventional planar and cylindrical film memories.

Although the invention has been described herein with reference to a single embodiment it is to be understood that various modifications and changes may be made thereto within the spirit of the invention. Thus various materials may be substituted for the materials herein used to form the layers and/or films. In addition, by way of definition, fine grained is herein intended to define a material grain size equal to or smaller than a domain wall width of the associated magnetic film material. Thus it is not intended to limit the scope of the invention except as defined by the following claims.

I claim:

1. A thin film all metallic closed flux storage element comprising:

a substrate for supporting the element;

a first thin magnetic film of thickness less than 5,000 A. disposed on the substrate, an electrically conductive material disposed substantially over the full surface of said first thin magnetic film;

a thin film of non-magnetic grain material having a grain size less than a domain wall width of the associated thin magnetic films to define a smoothing layer disposed on said electrically conductive material;

a second thin magnetic film of thickness less than 5,000 A. disposed on said non-magnetic fine grain material; and flux closure films of magnetic material disposed to span across and provide a full continuous flux path of matching magnetization saturation between the edges of said first and second thin magnetic films;

wherein said first and second magnetic films, said flux closure films, said electrically conductive material and said fine grain material define a thin film all-metallic closed flux storage element.

2. The element of claim 1 wherein said first and second thin magnetic films are formed of a soft magnetic material having a coercive force of the order of 0.1 to 30 oersteds and an anisotropy field of 0.5 to 40 oersteds.

3. The element of claim 1 wherein the first thin magnetic film is formed of a hard magnetic material having a coercive force of the order of 5–50 oersteds and an anisotropy field of 8–20 oersteds, and the second thin magnetic film is formed of a soft magnetic material having a coercive force of the order of 0.1 to 30 oersteds and an anisotropy field of 0.5 to 40 oersteds.

4. The element of claim 1 wherein the flux closure films have thicknesses of the order of from 100 A. to 1 micron, and the non-magnetic fine grained film is taken from the group of materials consisting of nickel-phosphorus, chromium, non-magnetic nickel-chromium, and rhodium, and has a thickness generally greater than 50 A.

References Cited

UNITED STATES PATENTS

| | | | |
|---|---|---|---|
| 2,825,892 | 3/1958 | Duinker | 340—174 |
| 3,078,447 | 2/1963 | Ketchledge | 340—174 |
| 3,157,866 | 11/1964 | Lien | 340—174 |
| 3,305,845 | 2/1967 | Grace et al. | 340—174 |

STANLEY M. URYNOWICZ, Jr., Primary Examiner